United States Patent [19]

Fetter

[11] Patent Number: 4,511,380
[45] Date of Patent: Apr. 16, 1985

[54] SUSPENSION AND SEALING OF LATTICEWORK AND FILTERS

[75] Inventor: Stephen M. Fetter, Louisville, Ky.

[73] Assignee: Allis-Chalmers Corp., Milwaukee, Wis.

[21] Appl. No.: 561,883

[22] Filed: Dec. 15, 1983

[51] Int. Cl.³ .............................................. B01D 46/00
[52] U.S. Cl. ....................................... 55/355; 55/483; 55/DIG. 31; 55/494; 55/502
[58] Field of Search ................. 55/355, 483, 484, 493, 55/495, 502, DIG. 31; 52/664, 665

[56] References Cited

U.S. PATENT DOCUMENTS

| | | | |
|---|---|---|---|
| 1,747,364 | 2/1930 | Greene | 55/483 |
| 3,093,221 | 6/1963 | Prudy | 52/665 |
| 3,486,311 | 12/1969 | Allan, Jr. | 55/355 |
| 3,552,104 | 1/1971 | Wood | 55/502 |
| 3,782,082 | 1/1974 | Smith et al. | 55/494 |
| 4,088,463 | 9/1977 | McSweeney | 55/664 X |
| 4,106,878 | 8/1978 | Jones | 52/664 |
| 4,233,044 | 11/1980 | Allan | 55/355 |
| 4,344,784 | 8/1982 | Deckas et al. | 55/483 X |

Primary Examiner—Charles Hart
Attorney, Agent, or Firm—Arthur L. Nelson

[57] ABSTRACT

A latticework adapted for suspension from the ceiling and forming a double channel configuration of cross members carrying a sealant for sealing the filters supported thereon.

10 Claims, 6 Drawing Figures

U.S. Patent   Apr. 16, 1985   Sheet 1 of 2   4,511,380
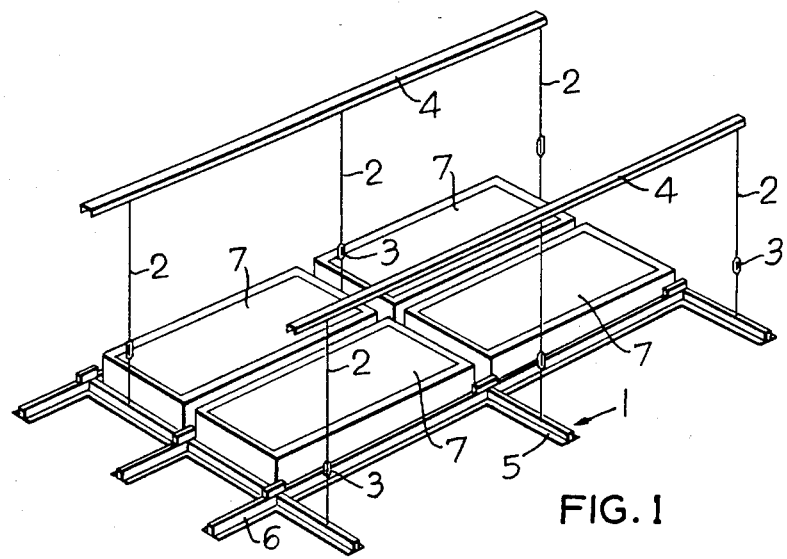
FIG. 1
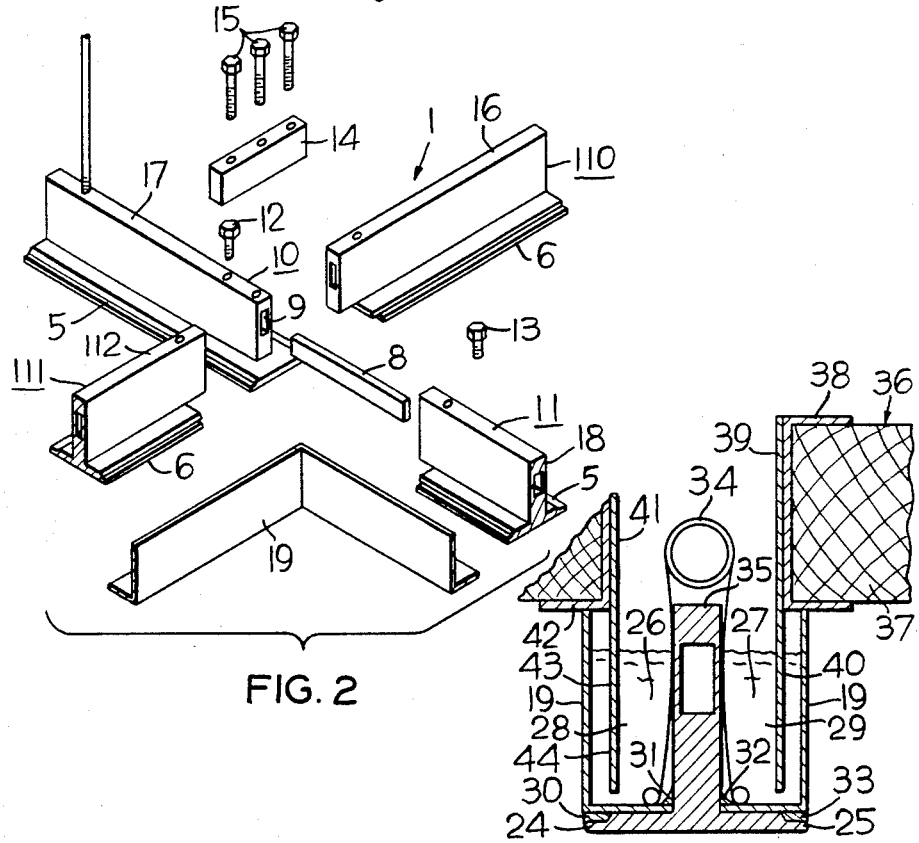
FIG. 2
FIG. 3

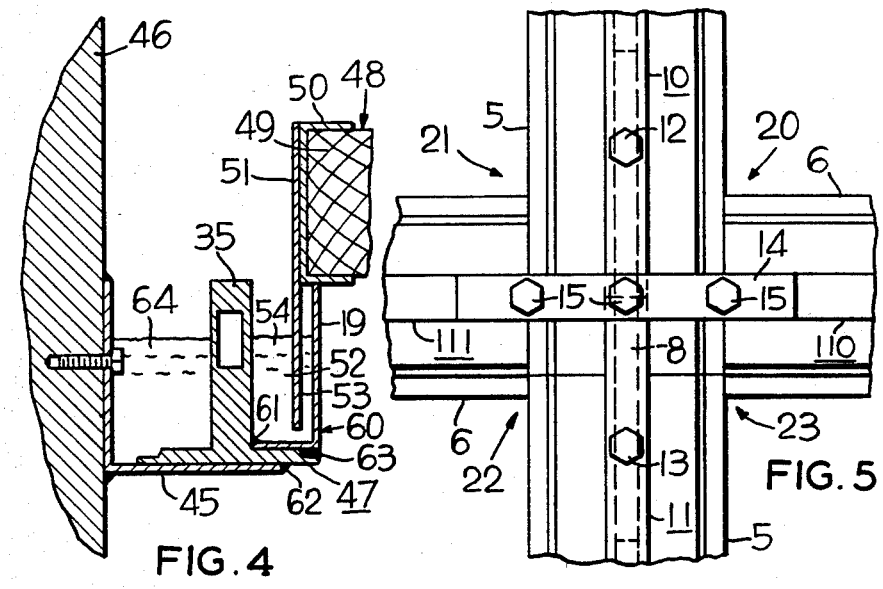
FIG. 4
FIG. 5
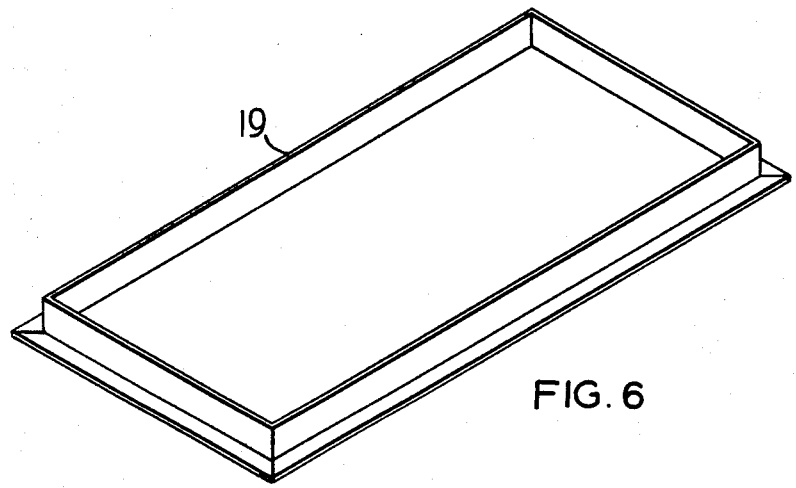
FIG. 6

SUSPENSION AND SEALING OF LATTICEWORK AND FILTERS

This invention relates to an air filtering system and more particularly to a latticework adapted for suspension from the ceiling and forming a double channel sealing and filtering support structure for a plurality of filters.

Clean room facilities require a dust-free environment. A continuous flow of air through a filter bank suspended from the ceiling will provide clean air flow. A grease seal may be used on the filter edge to provide a sealing arrangement to avoid leakage. The Allan, Jr. U.S. Pat. No. 3,486,311, illustrates such an arrangement in which sealant is carried in a channel and a peripheral flange of the filter is seated in the channel to form an air tight seal between the filter support in the latticework and the filter. The knife edge of adjacent filters are received in the same channel. The channels extend the length and width of the room and all channels are in continuous communication with each other.

The applicant's invention, however, provides for a double channel with a perimeter channel chamber around the filter opening to receive the peripheral edge of the filter element. The latticework supporting the filter can be assembled and disassembled readily and it consists essentially of an inverted T-shaped cross member for supporting channel frames which are aligned in the filter openings. The assembly is caulked to provide seal integrity. A double channel forms perimeter channel chambers around each filter opening which receives a peripheral flange of each of the filter elements. Each of the perimeter channel chambers is isolated from its adjacent perimeter channel chamber to facilitate assembly or individual replacement of any of the filter elements without disturbing the seal of any other filter elements. Accordingly, these advantages are believed to patentably distinguish the applicant's invention over the Allan, Jr. et al patent.

It is an object of this invention to provide a filter supporting latticework adapted for support from a ceiling and defining a plurality of filter openings. The filter openings receive an angle frame to form a perimeter channel chamber for receiving a peripheral flange of a filter element to form a sealed assembly.

It is another object of this invention to provide a latticework of a plurality of inverted T-shaped cross-sectional members forming a filter opening and carrying an angle frame to form peripheral channel chambers around the filter opening adapted to receive a sealant. A downwardly extending flange on a filter element in the sealant provides a permanent seal between the latticework and the filter element.

It is a further object of this invention to provide a suspended latticework including cross members forming double channel chambers defining filter openings. The perimeter of the filter openings defines perimeter channel chambers for receiving a peripheral flange on the filter element immersed in a sealant in a channel chamber for providing a sealed filter assembly.

The objects of this invention are accomplished with a latticework including a plurality of filter supporting members having an inverted T-shaped cross-sectional configuration defining filter openings. An angle frame having an angle cross section is received in each of the filter openings and forms a perimeter channel chamber adapted to receive a sealant. The filter element has a peripheral flange extending downwardly and is received in the peripheral chamber to provide a sealed filter assembly.

Referring to the drawings, the preferred embodiment of this invention is illustrated.

FIG. 1 illustrates an isometric view of the latticework suspended from support beams;

FIG. 2 illustrates an exploded view of the filter supporting cross members;

FIG. 3 is a cross-section view of double channel filter supporting members with the filters in the assembled position;

FIG. 4 is a cross-section view of the filter in the operating position using a single channel mounted on the wall of the room;

FIG. 5 is an assembled plan view of the intersection of the cross members shown in FIG. 2 but in the assembled position; and FIG. 6 is an isometric view of the angle frame used in the assembly of the latticework.

Referring to the drawings, FIG. 1 illustrates an isometric view of the latticework suspended from the supporting structure on the ceiling. The latticework 1 is supported by the struts 2 which include a plurality of turnbuckles 3. The struts 2 are carried by the beams 4 mounted on the ceiling of the room. The latticework 1 includes the supporting cross members 5 and the supported cross members 6. The filters 7 are shown in position on the assembled latticework 1.

The supporting cross members 5, 6 are shown in FIG. 2 in an exploded view. The cross members 5 are connected to the link 8 which is inserted in an opening 9 as shown in the segment 10 and a similar opening in the segment 11. The link 8 is inserted in the openings and then fastened by means of the set screws 12, 13. A supported cross member 6 includes the segments 110, 111 which are fastened together by the bar 14. The bar 14 is fastened to the segments 110, 111 by means of the plurality of bolts 15. In the assembled position, the center wall 16 of the segment 110 and the center wall 112 of segment 111 abut the center wall 17 of segment 10 and center wall 18 of segment 11. These components are shown in the assembled position in FIG. 5. The angle frame 19 is shown in FIGS. 2 and 6. FIG. 5 shows the filter openings 20, 21, 22, 23. An angle frame is positioned in each one of the filter openings to form a double channel cross section as illustrated in FIG. 3. An angle frame 19 is positioned as shown and carried on the base flanges 24, 25 shown in FIG. 3. This forms perimeter channel chambers 26, 27 receiving sealant 28, 29. To assure the seal integrity the caulking compound is positioned by the beads 30, 31, 32, 33. A hold down clip 34 is held on the center wall 35 as shown in FIG. 3. Although gravity would normally hold the angle frame in position, the hold down clip 34 is added assurance that seal integrity of the members is maintained.

The filter 36 includes a filtering material 37 supported by the frame 38 on the perimeter of the filter 36. Peripheral flanges 39, 41 extend downwardly into the channel chambers 27, 26 into the sealant 28, 29 which maintains an airtight interface 40 with the flange in its operating position. Similarly, the flange 41 also has a peripheral frame 42 which carries a flange 43. The flange 43 extends into the perimeter sealing chamber 26 and the sealant 28. The flange 43 forms a sealed interface 44 with the sealant 28.

Referring to FIG. 4, a shelf angle 45 is fastened to the wall 46. Only a single channel is needed for filter sealing here since it is abutting the wall of the room. The T-bar forms a support member 47 and a channel 60 with angle frame 19 which carries the filter 48 which includes filtering material 49 and a retaining frame 50. Flange 51 extends downwardly into the chamber 52 to form an interface 53 with the sealant 54. Accordingly, the seal formed by the peripheral flange on the filters with a sealant in the channel chambers provides an airtight seal around the filters. Caulking material 61, 62, 63 is used to seal support member 47 to form chambers 56, 64. This avoids any seal leaks in the ventilating system which is circulating air through the filters.

The operation of the device will be described in the following paragraphs.

The supporting beams 4 are supported on the ceiling of the room and suspended from the beams are the struts 2 which extend downwardly to supporting cross members 5. The supporting cross members 5 are assembled in the position shown in FIG. 5 and then the supported members 6 are also assembled in the position shown in FIG. 5. To the assembly of these components an angle frame is then positioned in each one of the filter openings 20, 21, 22, 23 to form a double channel filter supporting structure. The sealant is a viscous material which is normally in the solid state in its operating position. The sealant is heated above its melting temperature so it can be poured into the channel chambers when each of the chambers of the latticework is leveled and is in its operating position. Since each chamber is isolated from the other chambers each chamber may be leveled individually and the whole latticework need not be level. The channel chamber is filled to a position which will be above the lower edge of the assembled position of the flange on the filter elements. When the sealant is positioned in each of the chambers, the flanges are then lowered into the operating position. There is no need to press the flanges into this position since they will slowly move to the operating position as shown in FIGS. 3 and 4 and a permanent sealed interface between the flange and the sealant will be automatically provided. Since the supporting structure provides a double channel sealing retaining structure, any one of the filter elements can be removed and replaced without disturbing seal integrity with the adjacent filter element. The latticework of the filter supporting structure can be easily assembled or disassembled.

FIG. 4 shows the T-bar support member 47 carried on the shelf angle 45 in a manner to allow for expansion and contraction of the latticework. Due to isolation of individual perimeter channel chambers from the other channel chambers, only leveling of the individual channel chambers is required and not the whole latticework. This permits fewer struts for overhead support and location of the struts less critical to allow for duct work, pipes, etc. above the latticework.

The embodiments of the invention in which an exclusive property or privilege is claimed are defined as follows:

1. A sealed air filter assembly comprising, a suspended latticework of a plurality of filter supporting members running lengthwise and crosswise, each member defining a vertical center wall with lateral horizontal base flanges forming an inverted T-shaped cross section, said filter supporting members defining a plurality of filter openings, an angle frame received in each of said openings forming a perimeter channel chamber receiving sealant, a caulking compound between the lateral base flanges and the angle frames sealing the bottom of the channel chambers, a plurality of filter elements, a peripheral flange on each filter element extending into a perimeter channel chamber thereby providing a sealed filter assembly.

2. A sealed filter assembly comprising, a suspended latticework of filter supporting members running lengthwise and crosswise and defining rectangular filter openings, lateral horizontal base flanges on each member with each member forming an inverted T-shaped cross-sectional configuration, an angle frame of rectangular shape received in each of said openings and resting on the base flanges of said filter support members to form the outer walls of double channel chambers with said support members, a caulking compound between said base flanges and said angle frames to seal the bottom of said channel chambers, sealant received in said double channel chambers, a filter element, a downwardly extending peripheral extension on each of said filter elements extending into the sealant in said channel chambers surrounding each of said rectangular filter openings to thereby provide a sealed filter assembly.

3. A sealed filter assembly comprising, a latticework of a plurality of filter supporting members arranged to form rectangular filter openings, an angle frame received in each filter opening, each member with the angle frames defining a double channel chamber cross-sectional configuration with each chamber forming a perimeter channel chamber around the filter opening receiving sealant, each member including an inverted T-shaped beam with horizontal lateral flanges, said angle frame each received in a filter opening on either side of the center wall of the inverted T-shaped beam supported on the lateral flanges, a caulking compound between said lateral flanges and said angle frame sealing the bottom of each channel chamber, a filter element having a downwardly extending peripheral flange each received in a perimeter chamber forming a sealed filter assembly.

4. A sealed filter assembly as set forth in claim 1 wherein, the central wall carries a plurality of hold down clips to retain said angle frame in the assembled position.

5. A sealed filter assembly as set forth in claim 2 wherein, the intersection of said filter supporting members includes a center wall, said center wall delineates four channel chambers at the intersection of said center walls.

6. A sealed filter assembly as set forth in claim 1 wherein, the intersection of said filter supporting members defines an integral fabricated structure with seal integrity for isolating adjacent perimeter channel chambers.

7. A sealed filter assembly as set forth in claim 1 wherein, said angle frame defines a right angle cross-sectional configuration, the vertical flange of said right angle defining the exterior wall of the channel chamber.

8. A sealed filter assembly as set forth in claim 1 wherein, the peripheral dimension of said angle frame is slightly smaller than the internal dimension of the center walls of said beams to accommodate reception of said angle frame in said filter openings.

9. A sealed filter assembly as set forth in claim 1 wherein, the intersection of said supporting members includes a structure for readily assembling and disassembling of the latticework.

10. A sealed filter assembly as set forth in claim 1 including, means adapted for suspending the latticework from the ceiling of the room, inverted T-shaped filter supporting member and angle frame define double channel sealant chambers.

* * * * *